UNITED STATES PATENT OFFICE.

ISAAC T. TICHENOR, OF AUBURN, ALABAMA.

PAINT.

SPECIFICATION forming part of Letters Patent No. 265,183, dated September 26, 1882.

Application filed May 4, 1882. (No specimens.)

*To all whom it may concern:*

Be it known that I, ISAAC T. TICHENOR, a citizen of the United States, residing at Auburn, in the county of Lee and State of Alabama, have invented certain new and useful Improvements in Paints, of which the following is a specification.

My invention relates to improvements in paints adapted for the decoration of houses, buildings, and articles of manufacture and merchandise.

According to my invention I dissolve tar in turpentine or other suitable solvent, after which I strain the solution thus obtained through gauze or a fine sieve, so as to free the same from any impurities or loose particles. I then add a quantity of beeswax, after which the mixture is heated sufficiently to dissolve the wax. I then add a quantity of kaolin or pure clay, which has been previously reduced with water to the consistency of thick cream or "whitewash." I then add white lead or zinc prepared in oil, and mix the whole together, adding linseed-oil in the desired proportion, and also for dark colors adding such coloring-matter as may be desired to give the proper effect. I sometimes use cotton-seed oil, and add a drier or rosin-oil in conjunction with or in substitution for the linseed-oil.

In carrying out my invention, when preparing white or light paints, I make my preparation as follows: I take one gallon of tar and dissolve it in from one-half to one gallon of turpentine or other suitable solvent, the quantity of turpentine used varying according to the condition of the tar at the time of use, owing to the temperature of the atmosphere and the age of the tar. In hot weather, and when the tar is new, a smaller quantity of turpentine is necessary; but in cold weather, and when using old tar, more turpentine should be employed. I then strain the mixture, as beforesaid. I then add half a pound to one pound of beeswax, and heat the mixture until the tar and wax are uniformly dissolved and mixed. I then take four gallons of kaolin or pure clay and reduce the same with water to the consistency of cream or whitewash. I then take twenty-five (25) pounds of white lead or zinc prepared in oil, and mix all together, adding from one and a half to two gallons of linseed-oil, after which the whole is well mixed together. When preparing dark colors I take one gallon of tar, treated as before stated, together with the same proportion of beeswax, and treated as in the preparation of white or light paints. I then mix with the solution two gallons of clay reduced to a paste-like condition, and add to the mixture one gallon of linseed-oil, adding to the compound coloring-matter of such kind and in such quantity as will give the desired tint or color to the mixture. The mass thus obtained may be thinned down with linseed-oil or linseed and cotton oil, or with either one, or with rosin-oil, or with either one or more of the said oils, either singly or combined.

Having thus described my invention, what I claim, and desire to secure by Letters Patent, is—

As a new article of manufacture, a paint composed of tar dissolved in turpentine or equivalent solvent, beeswax, white lead or zinc, or other suitable coloring-matter, kaolin or fine clay and oil, substantially in the proportions as set forth and described.

In testimony whereof I have hereunto set my hand this 10th day of April, A. D. 1882.

ISAAC T. TICHENOR.

Witnesses:
J. H. DRAKE,
F. M. REESE.